(12) United States Patent
Furuya et al.

(10) Patent No.: US 10,535,992 B2
(45) Date of Patent: Jan. 14, 2020

(54) SWITCHING REGULATOR CIRCUIT

(71) Applicant: NEW JAPAN RADIO CO., LTD., Tokyo (JP)

(72) Inventors: Hitoshi Furuya, Fujimino (JP); Masayoshi Sato, Fujimino (JP)

(73) Assignee: NEW JAPAN RADIO CO., LTD., Tokyo (JP)

( * ) Notice: Subject to any disclaimer, the term of this patent is extended or adjusted under 35 U.S.C. 154(b) by 257 days.

(21) Appl. No.: 15/582,234

(22) Filed: Apr. 28, 2017

(65) Prior Publication Data

US 2018/0316181 A1    Nov. 1, 2018

(51) Int. Cl.
| | |
|---|---|
| *H02H 7/12* | (2006.01) |
| *H02M 3/158* | (2006.01) |
| *H02H 3/087* | (2006.01) |
| *H02M 3/156* | (2006.01) |
| *H02H 7/10* | (2006.01) |
| *H02M 1/32* | (2007.01) |

(52) U.S. Cl.
CPC .......... *H02H 7/1213* (2013.01); *H02H 3/087* (2013.01); *H02H 7/10* (2013.01); *H02M 1/32* (2013.01); *H02M 3/156* (2013.01)

(58) Field of Classification Search
CPC ........ H02H 7/1213; H02H 3/087; H02H 7/10; H02M 1/32; H02M 3/156
USPC .......................................................... 361/18
See application file for complete search history.

(56) References Cited

U.S. PATENT DOCUMENTS

2018/0294719 A1* 10/2018 Khatib .................. H02M 3/158

FOREIGN PATENT DOCUMENTS

| JP | 2006025547 A | 1/2006 |
|---|---|---|
| JP | 2014-003850 | 1/2014 |

OTHER PUBLICATIONS

Notice of Reasons for Refusal for related JP App No: 2015-219179 dated Aug. 28, 2019, 8 pgs.

* cited by examiner

*Primary Examiner* — Zeev V Kitov
(74) *Attorney, Agent, or Firm* — Procopio, Cory, Hargreaves & Savitch LLP

(57) ABSTRACT

One embodiment provides a switching regulator circuit having an overcurrent protection function that enables complete overcurrent protection though simple in configuration. The switching regulator circuit generates an output signal while boosting an input voltage by switching on/off a switching element using a PWM signal. The switching regulator circuit is equipped with a load switch which is connected to the switching element in series and is normally on. And, the switching regulator circuit is further equipped with an overcurrent protection circuit which keeps the load switch off if a current flowing through the switching element is an overcurrent.

5 Claims, 4 Drawing Sheets

SWITCHING REGULATOR CIRCUIT

TECHNICAL FIELD

The present invention relates to a switching regulator circuit that performs, as a countermeasure, a proper protective operation at the occurrence of an overcurrent.

BACKGROUND

FIG. 4 shows a conventional step-up switching regulator circuit (refer to JP-2014-003850-A, for example). This switching regulator circuit is equipped with an NMOS switching transistor MN1 for voltage boosting, an inductor L1 in which energy is stored by a current that flows through it according to an input voltage Vin when the transistor MN1 is turned on, a diode D1 for charging an output capacitor C1 by a counter electromotive force current that flows from the inductor L1 when the transistor MN1 is turned off, a sense resistor Rs for detecting a current flowing through the transistor MN1, voltage division resistors Rd1 and Rd2 for generating a feedback voltage Vfb by dividing an output voltage Vout across the output capacitor C1, a switching control circuit 200 for PWM-controlling the switching of the transistor MN1 using the feedback voltage Vfb so that the output voltage Vout becomes equal to a target value and performs an overcurrent protection operation for the transistor MN1 on the basis of the voltage Vs detected by the sense resistor Rs, and a soft start circuit 300 for causing the switching regulator circuit to start operating slowly.

The switching control circuit 200 is equipped with an error amplifier 201 for generating an error voltage Verr by comparing the feedback voltage Vfb with a reference voltage Vref3 that corresponds to the target output voltage, a PWM circuit 202 for controlling the duty ratio of a PWM signal according to the error voltage Verr that is output from the error amplifier 201, a logic circuit 203 for processing the PWM signal generated by the PWM circuit 202, and a drive circuit 204 for generating a gate control voltage Vg1 according to a PWM signal that is output from the logic circuit 203 and thereby driving (i.e., switching) the transistor MN1.

The switching control circuit 200 is also equipped with an overcurrent detection comparator 205 for setting its output signal at "H" if the voltage Vs detected by the sense resistor Rs is higher than a reference value Vref1, an overcurrent detection comparator 206 for setting its output signal at "H" if the voltage Vs detected by the sense resistor Rs is higher than a reference value Vref2 (>Vref1), a counter 207 for counting the number of times the output signal of the comparator 205 becomes "H," and an OR circuit 208 for taking the logical addition ("OR") of the output signals of the comparator 206 and the counter 207.

The soft start circuit 300 causes an internal power source voltage to rise slowing at the time of power-on. If the output signal of the OR circuit 208 is "H," the soft start circuit 300 stops operation of the entire switching regulator circuit by discharging a built-in capacitor (not shown).

In the switching regulator circuit shown in FIG. 4, the output voltage of the comparator 205 is set at "H" if the voltage Vs detected by the sensor resistor Rs is higher than the reference value Vref1, and the output voltages of the comparators 205 and 206 are set at "H" if the voltage Vs detected by the sensor resistor Rs is higher than the reference value Vref2. In either case, the logic circuit 203 interrupts the supply of the PWM signal to the drive circuit 204 and hence the transistor MN1 is turned off, whereby overcurrent protection is effected.

The output signal of the comparator 206 being "H" means that a large overcurrent is flowing through the transistor MN1. In this case, the built-in capacitor of the soft start circuit 300 is discharged immediately via the OR circuit 208 and operation of the entire switching regulator circuit is stopped.

The output signal of the comparator 205 being "H" means that a relatively small overcurrent is flowing trough the transistor MN1. This, in itself, does not cause discharge of the built-in capacitor of the soft start circuit 300. However, if the number of times the output signal of the comparator 205 becomes "H" has reached a prescribed number, the output signal of the counter 207 is set at "H" with a judgment that an overcurrent state is occurring continuously at times when switching is made.

Thus, the output signal of the counter 207 is changed to "H" and the built-in capacitor of the soft start circuit 300 is discharged immediately via the OR circuit 208 and operation of the entire switching regulator circuit is stopped.

However, in the switching regulator circuit shown FIG. 4, when the transistor MN1 is destroyed by short-circuiting due to an overcurrent, the result is only the logic circuit 203's stopping output of a PWM signal or discharge of the built-in capacitor of the soft start circuit 300. The short-circuit state of the transistor MN1 is maintained until operation of the entire switching regulator circuit is stopped. This protecting operation is thus incomplete.

In a case that a relatively small overcurrent is continuing, the built-in capacitor of the soft start circuit 300 is discharged if the counter has detected an output signal "H" of the comparator 205 the prescribed number of times. However, where the switching cycle of the transistor MN1 is long, it takes long time for the count of the counter 207 to reach the prescribed number, resulting in insufficient overcurrent protection. This kind of situation may occur because the switching frequency of the transistor MN1 is an item that a user can set in a desired manner.

Furthermore, the fact that the soft start circuit is used to stop operation of the entire switching regulator circuit requires a special configuration.

SUMMARY

One object of the invention is therefore to provide a switching regulator circuit having in overcurrent protection function that enables complete overcurrent protection though simple in configuration.

According to the invention of Aspect 1, there is provided a switching regulator circuit including:

a switching element which is switched on/off in accordance with a PWM signal to generate an output signal while boosting, lowering, or inverting an input voltage:

a load switch which is connected to the switching element in series and is normally on; and an overcurrent protection circuit which keeps the load switch off if a current flowing through the switching element is an overcurrent.

According to the invention of Aspect 2, based on Aspect 1, there is provided the switching regulator circuit, wherein the overcurrent protection circuit keeps the load switch off if an overcurrent detection state that a voltage corresponding to the current flowing through the switching element is higher than a first reference value is repeated at times when the switching element is switched has continued for more than a prescribed timer-counted time.

According to the invention of Aspect 3, based on Aspect 1, there is provided
the switching regulator circuit,
wherein the overcurrent protection circuit keeps the load switch off if a voltage corresponding to the current flowing through the switching element is higher than a second reference value.

According to the invention of Aspect 4, based on Aspect 3, there is provided
the switching regulator circuit,
wherein the overcurrent protection circuit keeps the load switch off if a state that the voltage corresponding to the current flowing through the switching element is higher than the second reference value has continued for a prescribed time or longer.

According to the invention of Aspect 5, based on Aspect 1, there is provided
the switching regulator circuit,
wherein the overcurrent protection circuit includes:
a first overcurrent protection circuit which keeps the load switch off if an overcurrent detection state that a voltage corresponding to the current flowing through the switching element is higher than a first reference value is repeated at times when the switching element is switched has continued for more than a prescribed timer-counted time; and
a second overcurrent protection circuit which keeps the load switch off if an overcurrent detection state occurs that the voltage corresponding to the current flowing through the switching element is higher than a second reference value that is larger than the first reference value.

According to the invention of Aspect 6, based on Aspect 5, there is provided
the switching regulator circuit,
wherein the second overcurrent protection circuit keeps the load switch off if the overcurrent detection state that the voltage corresponding to the current flowing through the switching element is higher than the second reference value has continued for a prescribed time or longer.

In the above-mentioned switching regulator circuit, the load switch which is connected to the switching element in series and is normally on is kept off upon occurrence of an overcurrent. Thus, even if a short-circuit accident occurs in the switching element, an overcurrent can be completely prevented from flowing though the switching element, which means complete overcurrent protection. This can be done without using a soft start function, and hence the switching regulator circuit is made simpler in configuration. In the case that the switching regulator circuit is configured so that the load switch is kept off if the period in which overcurrent detection is repeated has continued for longer than the prescribed timer-counted time, overcurrent protection can be effected using the prescribed timer-counted time irrespective of the number of times of detection of an overcurrent even in a case that the switching cycle of the switching element is set at a desired value by a user. Effective overcurrent protection can thus be realized.

DETAILED DESCRIPTION

Figure 1:
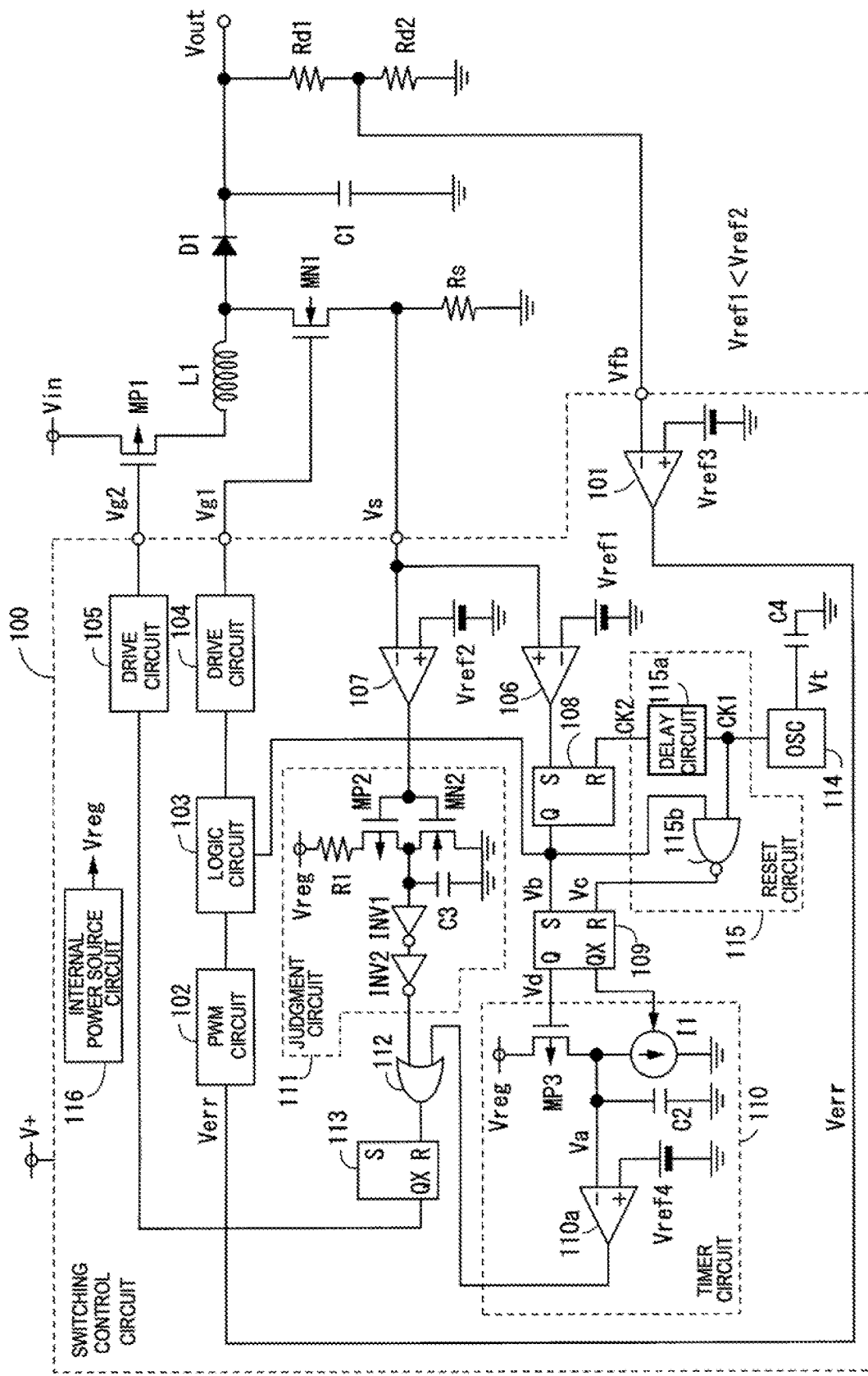
FIG. 1 is a step-up circuit diagram of a switching regulator circuit according to an embodiment.

FIG. 1 shows a step-up switching regulator circuit according to an embodiment. The switching regulator circuit according to the embodiment is equipped with a PMOS transistor MP1 as a load switch which is normally on and is turned off upon occurrence of a prescribed overcurrent, an NMOS transistor MN1 as a switching element which selves for voltage boosting, an inductor L1 in which energy is stored by a current that flows through it according to an input voltage Vin when the transistor MN1 is turned on, a diode D1 for charging an output capacitor C1 by a counter electromotive force current that flows from the inductor L1 when the transistor MN1 is turned off, a sense resistor Rs for detecting a current flowing through the transistor MN1, voltage division resistors Rd1 and Rd2 for generating a feedback voltage Vfb by dividing an output voltage Vout across the output capacitor C1, and a switching control circuit 100 for PWM-controlling the switching of the transistor MN1 using the feedback voltage Vfb so that the output voltage Vout becomes equal to a target value and performs an overcurrent protection operation for the transistor MN1 on the basis of the voltage Vs detected by the sense resistor Rs.

The switching control circuit 100 is equipped with an error amplifier 101 for generating an error voltage Verr by comparing the feedback voltage Vfb with a reference voltage Vref3 that corresponds to the target output voltage, a PWM circuit 102 for controlling the duty ratio of a PWM signal according to the error voltage Verr that is output from the error amplifier 101, a logic circuit 103 for processing the PWM signal generated by the PWM circuit 102, a drive circuit 104 for generating a gate control voltage Vg1 according to a PWM signal that is output from the logic circuit 103 and thereby driving (i.e., switching) the transistor MN1, and a drive circuit 105 for keeping the transistor MP1 on normally and, upon occurrence of a prescribed overcurrent, turns off the transistor MP1 and maintains (latches) its off state.

The switching control circuit 100 is also equipped with an overcurrent detection comparator 106 for setting its output signal at "H" if the voltage Vs detected by the sense resistor Rs is higher than a reference value Vref1, an overcorrect detection comparator 107 for setting its output signal at "L" if the voltage Vs detected by the sense resistor Rs is higher than a reference value Vref2 (>Vref1), an FF circuit 108 for setting its Q output "H" every time the output signal of the comparator 106 becomes "H" an FF circuit 109 for setting its Q output (Vd) at "H" and its inverted QX output at "L" when the Q output (Vb) of the FF circuit 108 becomes "H" and setting its Q output (Vd) at "L" and its inverted QX output at "H" when the voltage Vb becomes "H," timer circuit 110 for setting its output signal "H" if a state that the Q output of the FF circuit 109 is "H" has continued for a prescribed time Ta, a judgment circuit 111 for setting its output signal "H" if a state that the output signal of the comparator 107 is "L" has continued for a prescribed time Tb, an OR circuit 112 for taking the logical addition ("OR") of the output signals of the timer circuit 110 and the judgment circuit 111, an FF circuit 113 for setting its inverted QX output at "H" when the output voltage of the OR circuit 112 becomes "H," a reset circuit 115 for generating a reset signal for the FF circuits 108 and 109 using a clock signal CK1 that is generated on the basis of a triangular signal Vt for PWM signal generation generated by an oscillation circuit 114, and an internal power source circuit 116 for generating a regulated internal power source voltage Vreg on the basis of an external input power source voltage V+.

The timer circuit 110 is equipped with a PMOS transistor MP3 which is connected to the internal power source voltage Vreg, a constant current source 11 which is connected between the transistor MP3 and the ground, a capacitor C2 which is connected to the current source 11 in parallel, and a comparator 110a for setting its output signal at "H" if the voltage across the capacitor C2 becomes lower than a reference voltage Vref4.

When the Q output and the QX output of the FF circuit 109 are "L"and "H," respectively, the transistor MP3 is turned on and the current source 11 is turned off, whereby the capacitor C2 is charged by a current flowing through the transistor MP3. When the Q output and the QX output of the FF circuit 109 are "H"and "L," respectively, the transistor MP3 is turned off and the current source 11 is turned on, whereby the capacitor C2 is discharged by a constant current flowing through it. If the discharge has continued for a timer-counted time Ta, the voltage across the capacitor C2 becomes lower than the reference voltage Vref4 and the output signal of the timer circuit 110 becomes "H."

The judgment circuit 111 is equipped with a resistor R1 which is connected to the internal power source voltage Vreg, a COMS circuit consisting of a PMOS transistor MP2 and an NMOS transistor MN2 whose common gate is connected to the output of the comparator 107, a capacitor C3 which is connected between the common drain of the transistors MP2 and MN2 and the ground, and a series connection of two inverters INV1 and INV2 which is connected to the common drain of the transistors MP2 and MN2.

In the judgment circuit 111, when the voltage Vs is lower than the reference voltage Vref2, the output voltage of the comparator 107 becomes "H," whereby the transistor MN2 is turned on and the capacitor C3 is discharged. When the voltage Vs is higher than the reference voltage Vref2, the output voltage of the comparator 107 becomes "L," whereby the transistor MN2 is turned off and the transistor MP2 is turned on and the capacitor C3 is thereby charged via the resistor R1. If the voltage across the capacitor C3 being charged exceeds a threshold voltage of the inverter INV1, the inverter INV1 is inverted, whereupon the inverter INV2 is inverted and its output voltage becomes "H." A time Tb to elapse from turning to "L" of the output voltage of the comparator 107 to turning to "H" of the output voltage of the inverter INV2 is set at, for example, about 100 nsec according to the time constant of the resistor R1 and the capacitor C3.

The reset circuit 115 is equipped with a delay circuit 115a for generating a clock CK2 by delaying, by a time Tc, the clock signal CK1 that is received from the triangular generator 114 which generates a triangular signal Vt and a NAND circuit 115b for taking the negated logical conjunction ("NAND") of the clock signal CK1 and the Q output of the FF circuit 108.

In the reset circuit 115, if the output voltage of the comparator 106 becomes "H" as a result of the voltage Vs's exceeding the reference value Vref1, the FF circuit 108 being set currently is reset by a rise of the clock CK2. The FF circuit 109 which is set when the Q output (Vb) of the FF circuit 108 becomes "H" is reset by a fall of the clock signal CK1 when the Q output (Vb) of the FF circuit 108 is "L."

Figure 2:
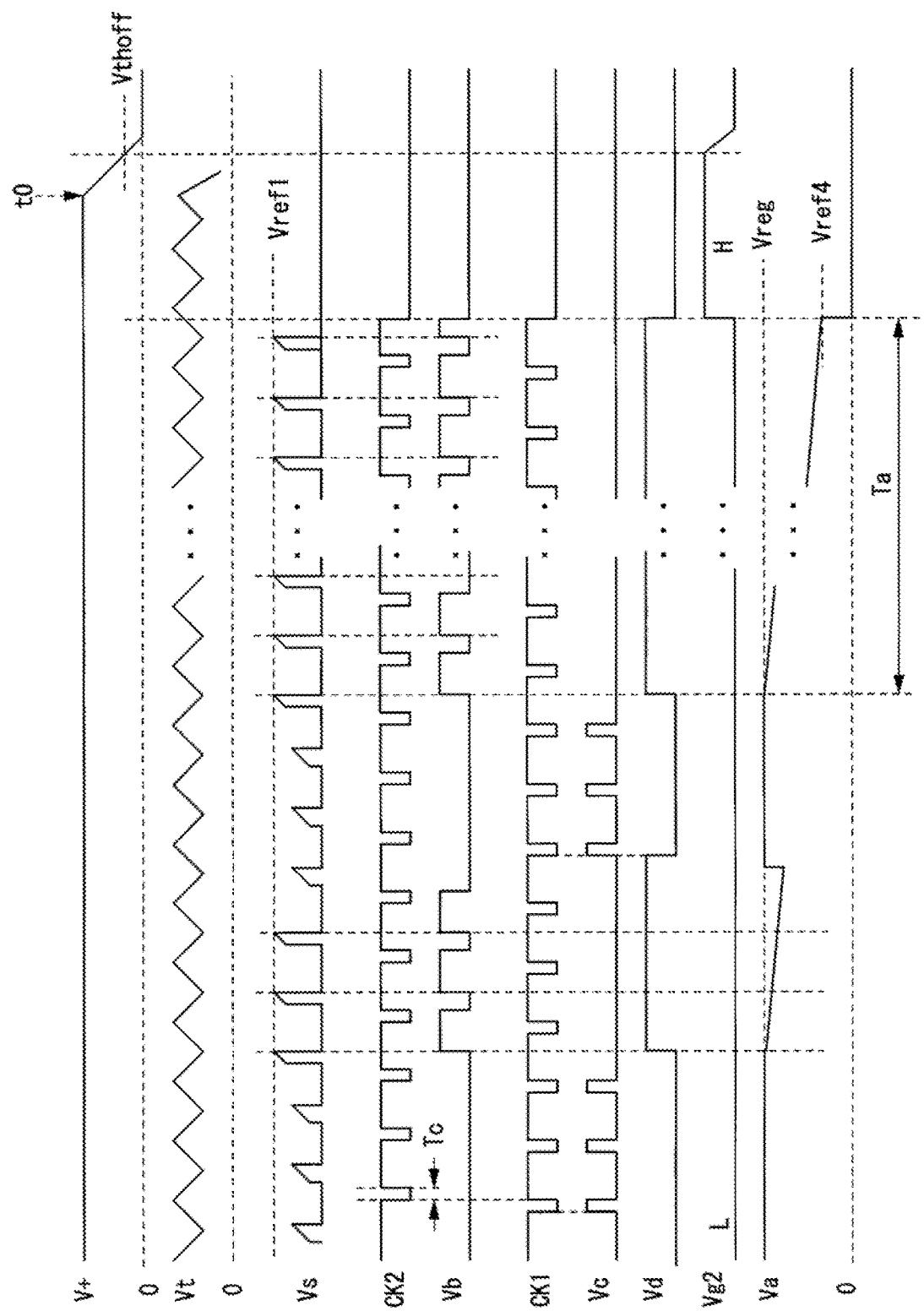
FIG. 2 is a waveform diagram of a case that relatively small overcurrents are detected repeatedly in the switching regulator circuit shown in FIG. 1.

(1) Operation at the Occurrence of a Small Overcurrent (FIG. 2)

If a small overcurrent flows through the switching transistor MN1 when it is turned on and the voltage detected by the sense resistor Rs thereby becomes higher than the reference value Vref1 for the comparator 106, the output signal of the comparator 106 becomes "H" and the Q output (Vb) of the FF circuit 108 becomes "H." In response, from this time point the logic circuit 103 interrupts the PWM signal that is output from the PWM circuit 102, whereby the pulse width of the PWM signal is made narrower than in the normal case. As a result, the transistor MN1 is turned off by the drive circuit 104 earlier than in the normal case and thus protected from the overcurrent.

(2) Operation in a State That Small Overcurrents are Occurring Repeatedly at Times When Switching is Made (FIG. 2)

In the timer circuit 110, when the Q output (Vd) and the QX output of the FF circuit 109 are "L" and "H," respectively, the transistor MP3 is turned on and the capacitor C2 is charged by the voltage Vreg. If thereafter the voltage Vs detected by the sense resistor Rs exceeds the reference voltage Vref1 for the comparator 106 and an overcurrent is thus detected, the Q output (Vb) of the FF circuit 108 becomes "H." In response, the Q output (Vd) and the QX output of the FF circuit 109 become "H" and "L," respectively, whereby the transistor MP3 is turned off and the constant current circuit 11 is activated. Thus, the capacitor C2 is discharged by a constant current, that is, the timer circuit 110 starts a time measurement. The voltage Va across the capacitor C2 decreases gradually.

The FF circuit 108 repeats an operation that its Q output (Vb) becomes "H" each time the voltage Vs exceeds the reference voltage Vref1 for the comparator 106. When the Q output (Vb) of the FF circuit 108 is "H," the clock signal CK1 is masked by the NAND circuit 115b and hence the reset circuit 115 cannot reset the FF circuit 109.

As a result, if the voltage Vs exceeds the reference voltage Vref1 for the comparator 106 every time the transistor MN1 is switched, the Q output (Vd) and the QX output of the FF circuit 109 continue to be "H" and "L," respectively. Thus, the voltage Va across the capacitor C2 becomes lower than the reference voltage Vref4 and the output signal of the timer circuit 110 becomes "H." As a result, the FF circuit 113 is reset via the OR circuit 112 and the transistor MP1 is turned off by the drive circuit 105.

As described above, in the embodiment, if an overcurrent is detected by the comparator 106 every time the transistor MN1 is switched and the total repetition time has exceeded the timer-counted time Ta, the transistor MP1 is kept off to effect overcurrent protection for the entire switching regulator circuit. If a power switch (not shown) for the power source voltage V+ is switched off at time t0, the entire switching regulator circuit stops its operation as soon as the voltage V+ becomes lower than a minimum operation voltage Vthoff. To cause the switching regulator circuit to operate again, it is necessary to apply the power source voltage V+ to it.

If the FF circuit 108 is reset with the output voltage of the comparator 106 left "L" (i.e., without detection of an overcurrent) before the voltage Va across the capacitor C2 becomes lower than the reference value Vref4, the voltage Vb becomes "L," the gate of the NAND gate 115b is opened, and the FF circuit 109 is reset at a fall of the clock signal CK1. As a result, the Q output (Vd) and the QX output of the FF circuit 109 become "L" and "H," respectively, and the capacitor C2 of the timer circuit 110 is charged again. That is, the timer circuit 110 is reset to prepare for detection of a later overcurrent.

Figure 3:
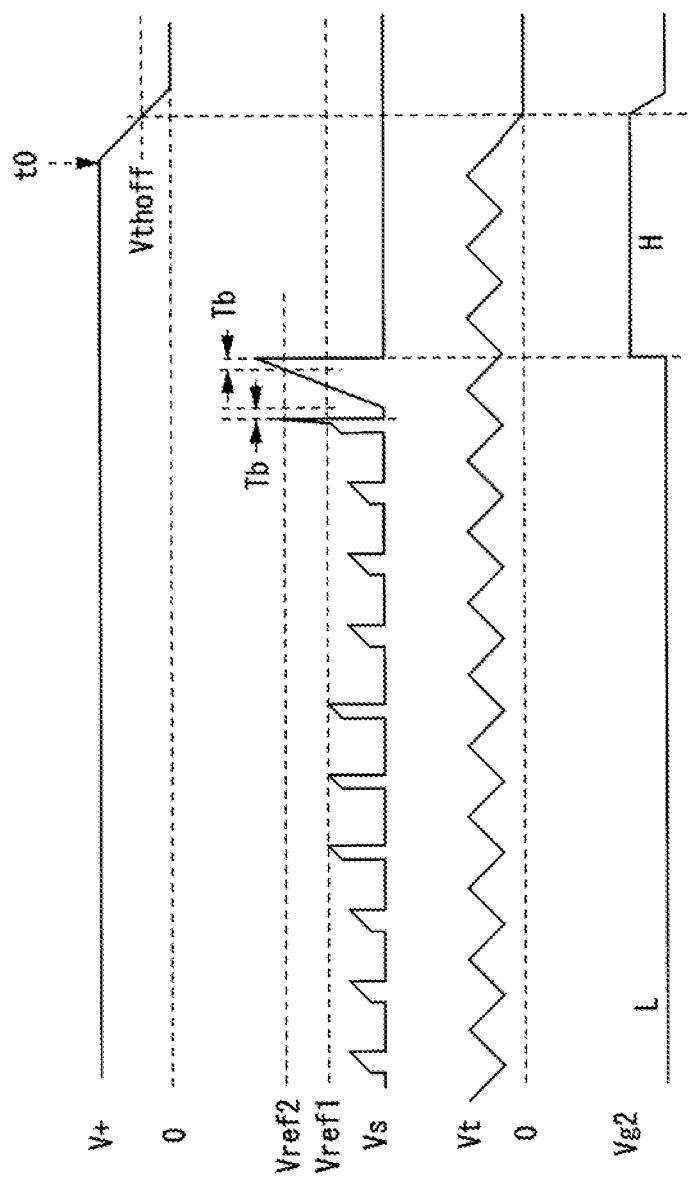
FIG. 3 is a waveform diagram of a case that a relatively large overcurrent is detected in the switching regulator circuit shown in FIG. 1.
Figure 4:
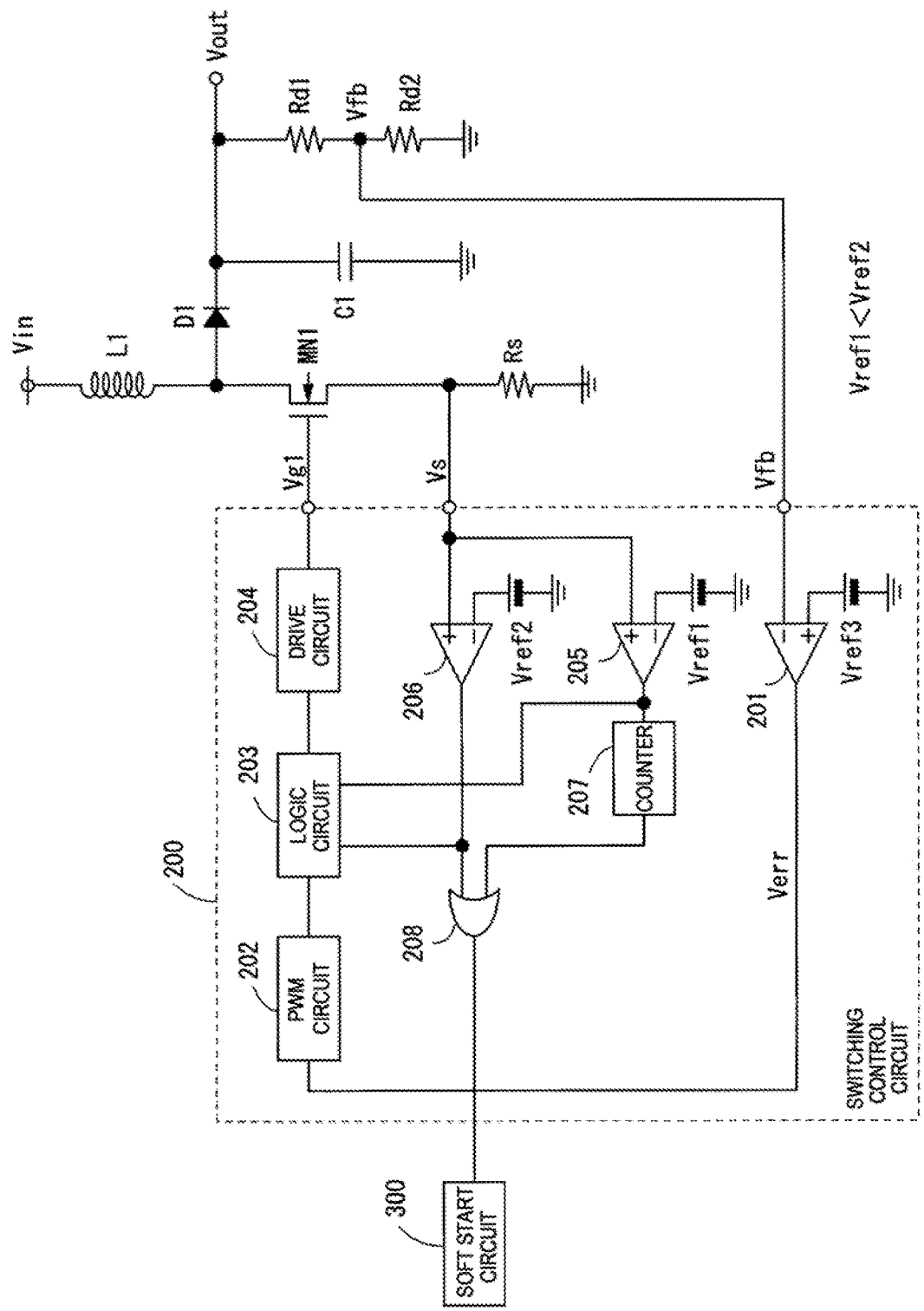
FIG. 4 is a circuit diagram of a conventional step-up switching regulator circuit.

(3) Operation at the Occurrence of a Large Overcurrent (FIG. 3)

If a large overcurrent flows through the switching transistor MN1 because of, for example, its short-circuiting and the voltage Vs detected by the sense resistor Rs thereby becomes higher than the reference value Vref2 for the comparator 107, the output signal of the comparator 107 becomes "L" and the judgment circuit 111 starts operating. In the judgment circuit 111, the capacitor C3 is stored with no charge because of discharging that occurred in a state that the output signal of the comparator 107 was "H." When the output signal of the comparator 107 becomes "L," charging of the capacitor C3 is started with the time constant of the resistor R1 and the capacitor C3. When the inverters INV1 and INV2 start operating because of increase of the voltage across the capacitor C3, the output signal of the OR circuit 112 becomes "H" and the QX output of the FF circuit 113 becomes "H." As a result, the transistor MP1 is kept off by the drive circuit 105, whereby the transistor MN1 is protected from the overcurrent.

As described above, if an overcurrent that is so large that the voltage Vs exceeds the reference value Vref2 for the comparator 107 has flown through the transistor MN1 for longer than the time Tb, a control is made so as to turn off the transistor MP1 to effect overcurrent protection.

If the judgment circuit 111 is replaced by one inverter, the QX output of the FF circuit 113 is turned to "H" immediately via the OR circuit 112 upon detection of an overcurrent by the comparator 107. This enables a control that the transistor MP1 is turned off immediately and kept off thereafter by the drive circuit 105.

In the switching regulator circuit described above, the transistor MN1 as a switching element can be replaced by a PMOS transistor. The transistor MP1 as a load switch can be replaced by an NMOS transistor. Furthermore, although the embodiment is directed to the step-up switching regulator circuit, the invention can also be applied to step-down and inverting switching regulator circuits.

The invention claimed is:

1. A switching regulator circuit including:
   a switching element which is switched on/off in accordance with a PWM signal to generate an output signal while boosting, lowering, or inverting an input voltage;
   a load switch which is connected to the switching element in series and is normally on; and
   an overcurrent protection circuit which keeps the load switch off if a current flowing through the switching element is an overcurrent,
   wherein the overcurrent protection circuit keeps the load switch off if an overcurrent detection state that a voltage corresponding the current flowing through the switching element is higher than a first reference value is repeated at times when the switching element is switched has continued for more than a prescribed timer-counted time.

2. The switching regulator circuit of claim 1,
   wherein the overcurrent protection circuit keeps the load switch off if a voltage corresponding to the current flowing through the switching element is higher than a second reference value.

3. The switching regulator circuit of claim 2,
   wherein the overcurrent protection circuit keeps the load switch off if a state that the voltage corresponding to the current flowing through the switching element is higher than the second reference value has continued for a prescribed time or longer.

4. The switching regulator circuit of claim 1,
   wherein the overcurrent protection circuit includes:
      a first overcurrent protection circuit which keeps the load switch off if an overcurrent detection state that a voltage corresponding to the current flowing through the switching element is higher than a first reference value is repeated at times when the switching element is switched has continued for more than a prescribed timer-counted time; and
      a second overcurrent protection circuit which keeps the load switch off if an overcurrent detection state occurs that the voltage corresponding to the current flowing through the switching element is higher than a second reference value that is larger than the first reference value.

5. The switching regulator circuit of claim 4,
   wherein the second overcurrent protection circuit keeps the load switch off if the overcurrent detection state that the voltage corresponding to the current flowing through the switching element is higher than the second reference value has continued for a prescribed time or longer.

* * * * *